US012620647B2

(12) United States Patent (10) Patent No.: US 12,620,647 B2

Ohata et al. (45) Date of Patent: May 5, 2026

(54) BATTERY SYSTEM

(71) Applicant: TOYOTA JIDOSHA KABUSHIKI KAISHA, Toyota (JP)

(72) Inventors: Hirotsugu Ohata, Susono (JP); Wan Leng Ang, Susono (JP); Shinya Asaura, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/760,263

(22) Filed: Jul. 1, 2024

(65) Prior Publication Data

US 2025/0112289 A1 Apr. 3, 2025

(30) Foreign Application Priority Data

Sep. 28, 2023 (JP) ................................. 2023-168434

(51) Int. Cl.

| | |
|---|---|
| *H01M 10/633* | (2014.01) |
| *B60L 58/27* | (2019.01) |
| *H01M 10/42* | (2006.01) |
| *H01M 10/615* | (2014.01) |
| *H01M 10/625* | (2014.01) |
| *H01M 10/6571* | (2014.01) |
| *H02P 27/06* | (2006.01) |
| *B60L 50/51* | (2019.01) |

(52) U.S. Cl.

CPC .......... *H01M 10/633* (2015.04); *B60L 58/27* (2019.02); *H01M 10/425* (2013.01); *H01M 10/615* (2015.04); *H01M 10/625* (2015.04); *H01M 10/6571* (2015.04); *H02P 27/06* (2013.01); *B60L 50/51* (2019.02); *H01M 2220/20* (2013.01)

(58) Field of Classification Search

CPC .............. B60L 58/27; B60L 2240/545; H01M 10/615; H01M 2220/20; H01M 10/625; Y02T 10/70

USPC .................................................. 307/9.1, 10.1

See application file for complete search history.

(56) References Cited

U.S. PATENT DOCUMENTS

| | | | | |
|---|---|---|---|---|
| 2012/0323430 | A1* | 12/2012 | Nakamura | B60L 50/51 |
| | | | | 701/22 |
| 2022/0169147 | A1* | 6/2022 | Huang | B60L 58/27 |
| 2022/0223937 | A1* | 7/2022 | Xu | B60L 50/60 |
| 2024/0347806 | A1 | 10/2024 | Takashima et al. | |

(Continued)

FOREIGN PATENT DOCUMENTS

JP 2023-095217 A 7/2023

*Primary Examiner* — Rexford N Barnie

*Assistant Examiner* — Swarna N Chowdhuri

(74) *Attorney, Agent, or Firm* — SoraIP, Inc.

(57) ABSTRACT

The DC power of the battery is converted into AC power by an inverter to drive a motor generator (MG). The control ECU executes the temperature raising control at the time of low temperature of the battery. During the temperature raising control, the control ECU sets the carrier frequency of the inverter to the resonance frequency of the battery circuit including the battery. The frequency of the switching ripple current coincides with the resonance frequency, and the amplitude of the current ripple increases, so that the battery can be efficiently raised in temperature (heated). The sound pressure level increases only in the region of the resonance frequency, and an increase in loudness can be reduced.

5 Claims, 4 Drawing Sheets

(56)             References Cited

U.S. PATENT DOCUMENTS

2024/0416763 A1* 12/2024 Ge ......................... B60L 58/26
2025/0105750 A1*  3/2025 Suzuki ................. H02M 1/327

* cited by examiner

FIG. 2

BATTERY SYSTEM

CROSS-REFERENCE TO RELATED APPLICATION

This application claims priority to Japanese Patent Application No. 2023-168434 filed on Sep. 28, 2023, incorporated herein by reference in its entirety.

BACKGROUND

1. Technical Field

The present disclosure relates to battery systems.

2. Description of Related Art

U.S. Unexamined Patent Application Publication No. 2022/0223937 discloses a battery electric vehicle equipped with a battery. In the battery electric vehicle of U.S. Unexamined Patent Application Publication No. 2022/0223937, direct current power of the battery is converted to alternating current power by an inverter to drive a motor generator. In U.S. Unexamined Patent Application Publication No. 2022/0223937, when the temperature of the battery is less than a threshold, a d-axis current of the motor generator is adjusted without changing the switching frequency of the inverter. An alternating current (current ripple) is thus generated in the battery to heat (raise the temperature of) the battery.

SUMMARY

When the frequency of current ripple (hereinafter also referred to as "ripple frequency") in an input and output current of a battery is controlled to a resonance frequency of a circuit including the battery (battery circuit), the amplitude of the current ripple increases due to resonance, so that the battery can be efficiently raised in temperature (heated). Therefore, one possible way to efficiently raise the temperature of the battery is to control the ripple frequency of an output current from an inverter (or an input current to the inverter) to the resonance frequency of the battery circuit.

The inverter is driven at a predetermined switching frequency (carrier frequency). A ripple current (switching ripple current) is generated by switching of the inverter. The ripple current flows through the battery circuit. Therefore, when the ripple frequency of the output current from the inverter is controlled to the resonance frequency of the battery circuit in order to raise the temperature of (heat) the battery, the sound pressure level increases in two frequency ranges, namely the switching frequency and the resonance frequency, which may increase loudness.

An object of the present disclosure is to efficiently raise the temperature of a battery and reduce an increase in loudness when raising the temperature of the battery.

A battery system according to the present disclosure includes: a battery; an electrical machine; an inverter connected between the battery and the electrical machine and configured to be driven at a predetermined switching frequency and to convert direct current power stored in the battery to alternating current power to supply the alternating current power to the electrical machine; and a control device. A circuit including the battery has a resonance frequency. The control device is configured to, when raising a temperature of the battery, set the switching frequency to the resonance frequency of the circuit including the battery and drive the inverter.

With this configuration, the direct current power stored in the battery is converted to alternating current power by the inverter, and the alternating current power is supplied to the electrical machine. The inverter is driven at the predetermined switching frequency by the control device. When raising the temperature of the battery, the switching frequency is set to the resonance frequency of the circuit including the battery (battery circuit).

When raising the temperature of the battery, the switching frequency is set to the resonance frequency. Therefore, the frequency of a switching ripple current (ripple current generated by switching of the inverter) becomes the resonance frequency. Accordingly, the amplitude of current ripple of the battery increases due to resonance, so that the battery can be efficiently raised in temperature (heated). Since the temperature of the battery is raised using the switching ripple current, the sound pressure level increases only in the region of the resonance frequency, so that an increase in loudness can be reduced.

Preferably, the battery system may be mounted on a vehicle, and the control device may be configured to raise the temperature of the battery when there is a request for external charging of the battery and the temperature of the battery is equal to or lower than a predetermined temperature.

With this configuration, when the temperature of a battery is low at the time of external charging of an electrified vehicle, the temperature of the battery is raised, so that the external charging can be performed satisfactorily.

Preferably, the electrical machine may be a rotating electrical machine, and the control device may be configured to, when raising the temperature of the battery, set a d-axis current of the rotating electrical machine to a predetermined value and set a q-axis current of the rotating electrical machine to zero.

With this configuration, when raising the temperature of the battery, the d-axis current to be supplied to the rotating electrical machine is set to the predetermined value, and the q-axis current is set to zero. Therefore, the temperature of the battery can be raised without outputting torque from the rotating electrical machine. The rotating electrical machine may be a synchronous motor, and may be, for example, an interior permanent magnet (IPM) synchronous motor.

According to the present disclosure, it is possible to efficiently raise the temperature of the battery and to reduce noise when raising the temperature of the battery.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 shows a part of a block-diagram of a MG control arranged in a control ECU;

DETAILED DESCRIPTION OF EMBODIMENTS

Figure 1:
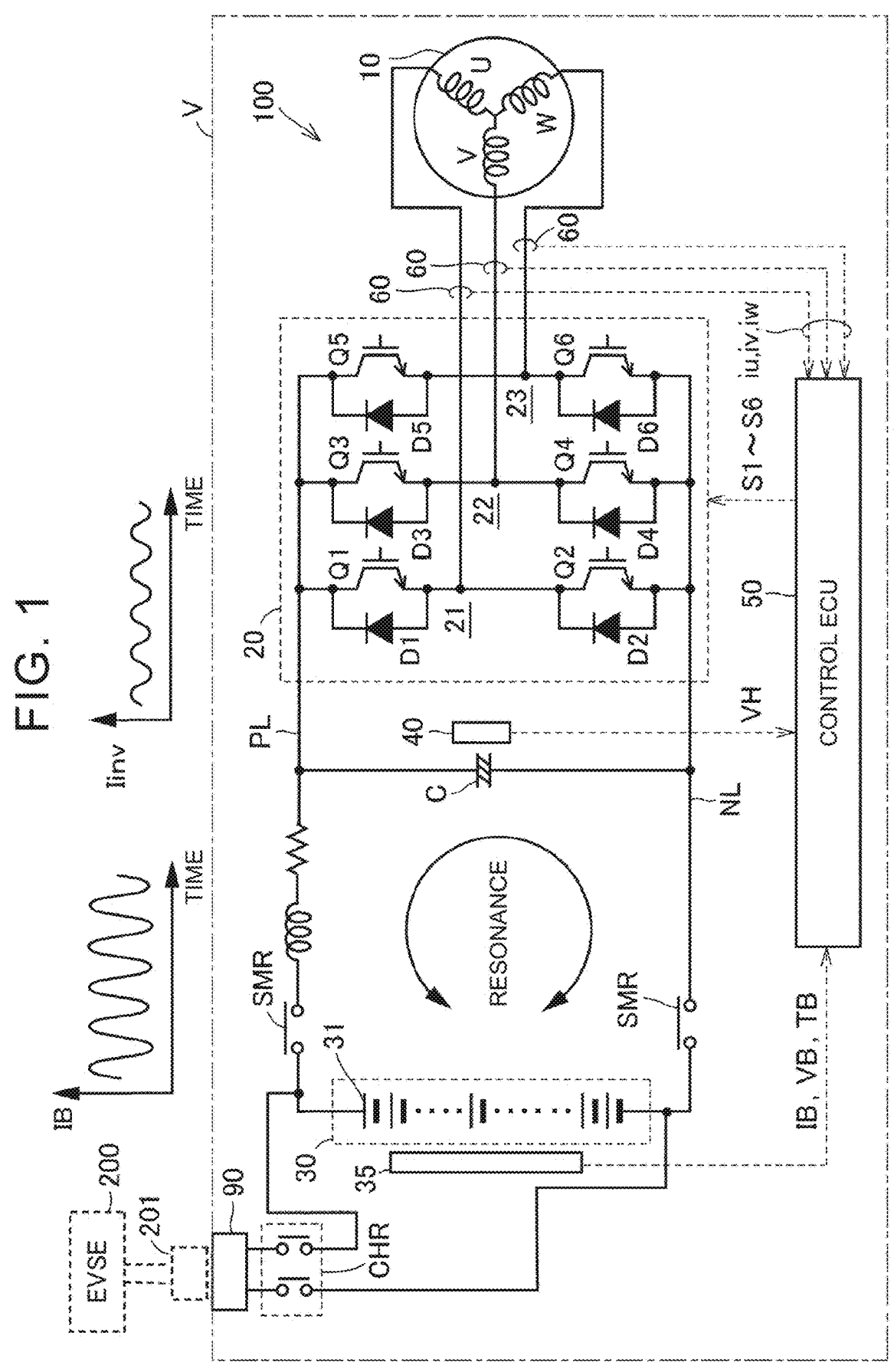
FIG. 1 is an overall configuration diagram of a battery system according to the present embodiment.

Hereinafter, embodiments of the present disclosure will be described in detail with reference to the drawings. It should be noted that the same or corresponding parts in the drawings are designated by the same reference characters and repetitive description will be omitted.

FIG. 1 is an overall configuration diagram of a battery system 100 according to the present embodiment. The battery system 100 according to the present embodiment is mounted on, for example, a vehicle V. The vehicle V may be battery electric vehicle and may be plug-in hybrid electric vehicle. Referring to FIG. 1, a battery system 100 includes an inverter 20 as a motor generator (MG) 10 and Power Control Unit (PCU), a battery 30, a system main relay SMR, and a control electronic control unit (ECU) 50 as a control device.

MG 10 is a driving electric motor that generates torques for driving drive wheels (not shown) of the vehicle V. MG 10 is a rotating electrical machine, and is, for example, a IPM synchronous motor in which permanent magnets are embedded in a rotor. MG 10 may further include a function of a generator, and may be configured to have a function of an electric motor and a generator. MG 10 is an example of the "electrical machine" of the present disclosure.

The battery 30 is constituted by a secondary battery such as a lithium-ion battery, and corresponds to a "battery" of the present disclosure. The secondary battery may be a battery having a liquid electrolyte between a positive electrode and a negative electrode, or may be a battery having a solid electrolyte (all-solid-state battery). The battery 30 is configured as a battery pack in which a plurality of unit cells (battery cells) 31 such as lithium ion batteries are electrically connected in series.

The battery 30 is provided with a monitoring unit 35. The monitoring unit 35 includes a sensor that detects the voltage VB of the unit cell 31, the input and output current IB of the battery 30, and the temperature TB of the battery 30, and outputs a signal indicating the detection result to the control ECU 50.

The system main relay SMR is connected between the positive terminal and the power line PL of the battery 30 and between the negative terminal and the power line NL of the battery 30. The system main relay SMR is switched in the open/close status by a control signal from the control ECU 50.

A capacitor C connected between the power line PL and the power line NL is provided between the inverter 20 and the battery 30. The capacitor C smooths the battery voltage and supplies it to the inverter 20. The voltage sensor 40 detects a voltage across the capacitor C, that is, a voltage (hereinafter, also referred to as "system voltage") VH between the power line PL, NL connecting the battery 30 and the inverter 20, and outputs a signal indicating the detection result to the control ECU 50.

The inverter 20 converts DC power supplied from the battery 30 into AC power and supplies the AC power to MG 10. The inverter 20 converts the AC power generated by MG 10 into DC power and provides the DC power to the battery 30. That is, the battery 30 can transmit and receive electric power to and from MG 10 through the inverter 20.

The inverter 20 includes a U-phase arm 21, a V-phase arm 22, and a W-phase arm 23. The phase arms are connected in parallel to each other between the power line PL and the power line NL. The U-phase arm 21 has switching elements Q1, Q2 connected in series with each other. The V-phase arm 22 has switching elements Q3, Q4 connected in series with each other. The W-phase arm 23 has switching elements Q5, Q6 connected in series with each other. Between the collectors and the emitters of the respective switching elements Q1 to Q6, diodes D1 to D6 are respectively connected in anti-parallel. The switching operation of the switching elements Q1 to Q6 is performed by the control signals (gated signals) S1 to S6 from the control ECU 50.

The intermediate points of the respective phase arms are connected to the respective phase ends of the respective phase coils of MG 10. The other ends of the three coils of the U-phase, the V-phase, and the W-phase of MG 10 are commonly connected to a neutral point. The current sensor 60 detects the three-phase current iu, iv, iw flowing through MG 10, and outputs a signal indicating the detection result to the control ECU 50.

Figure 2:
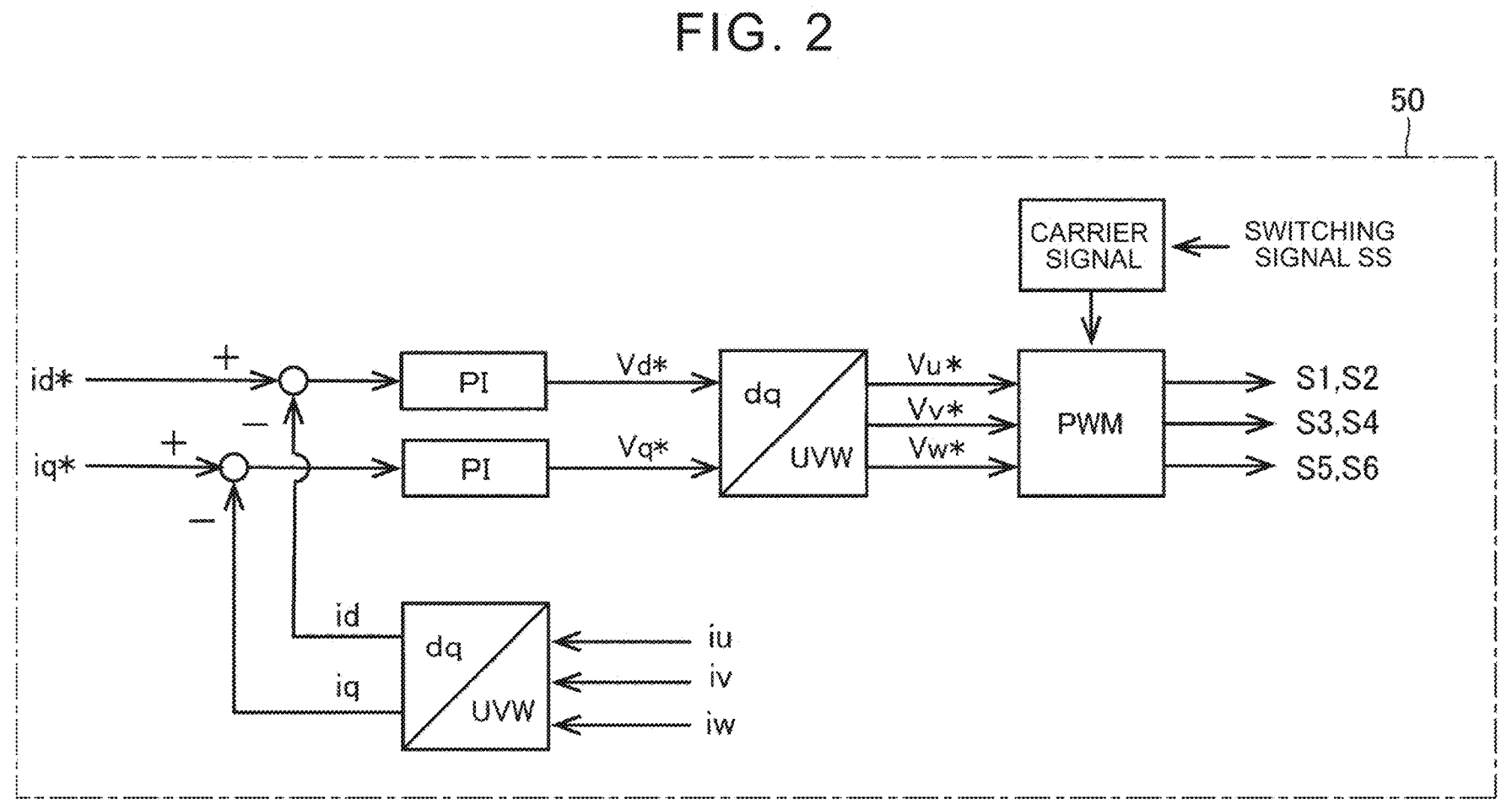

Inverter 20 is controlled by a control ECU 50 at a predetermined switching Pulse Width Modulation (PWM) to drive MG 10. FIG. 2 is a diagram illustrating a part of a block diagram of MG control configured in a control ECU 50. The software (program) and hardware of the control ECU 50 cooperate to configure the functions of this block-diagram. The control ECU 50 converts the three-phase current iu, iv, iw detected by the current sensor 60 into UVW-dq to obtain the d-axis current id and the q-axis current iq. The control ECU 50 calculates the d-axis current command value id* and the q-axis current command value iq* based on the output torque command value. Then, the d-axis voltage command Vd* is obtained by PT control using the d-axis current command id and the d-axis current id. In addition, the q-axis voltage command Vq* is obtained by PI control using the q-axis current command iq and the q-axis current iq.

The control ECU 50 converts the d-axis voltage command Vd* and the q-axis voltage command Vq* by dq-UVW to obtain a three-phase voltage command Uv*, Vv*, Wv*. The control signals S1 to S6 are generated by PWM control using a carrier (triangular wave) signal so that a voltage of the three-phase voltage command Uv*, Vv*, Wv* is supplied to each of the U-phase, the V-phase, and the W-phase of MG 10, and the inverter 20 is driven. The switching frequency of the inverter 20 varies depending on the frequency (carrier frequency) of the carrier signal, and the switching frequency has the same value as the carrier frequency. In the present disclosure, the switching frequency and the carrier frequency are synonymous. In the present embodiment, the carrier frequency (switching frequency) can be varied by the switching SS.

The vehicle V includes an inlet 90, and the battery 30 is charged using electric power from an external power source. The inlet 90 is connected to the positive terminal and the negative terminal of the battery 30 via a charging-relay CHR. When the plug 201 of Electric Vehicle Supply Equipment (EVSE) 200 is connected to the inlet 90 and the charging-relay CHR is closed, charging (external charging) by an external power source is enabled.

When the temperature TB of the battery 30 is low, the charge/discharge performance is deteriorated due to an increase in the internal resistance or the like. Therefore, when the temperature TB of the battery 30 is low, it is desirable to raise the temperature of the battery 30. It is conceivable that a ripple current is supplied to the battery 30 to generate a current ripple, and the generated Joule heat is used to raise the temperature of the battery 30. A battery circuit (a LC series circuit or a RLC series circuit) including the battery 30, the capacitor C, and the like has a resonance frequency Rf. When the frequency (ripple frequency) of the current ripple for raising the temperature of the battery 30 coincides with the resonance frequency Rf, the amplitude of the current ripple increases due to the resonance, and the amount of Joule heat generated increases, so that the temperature of the battery 30 can be efficiently raised.

Figure 3:
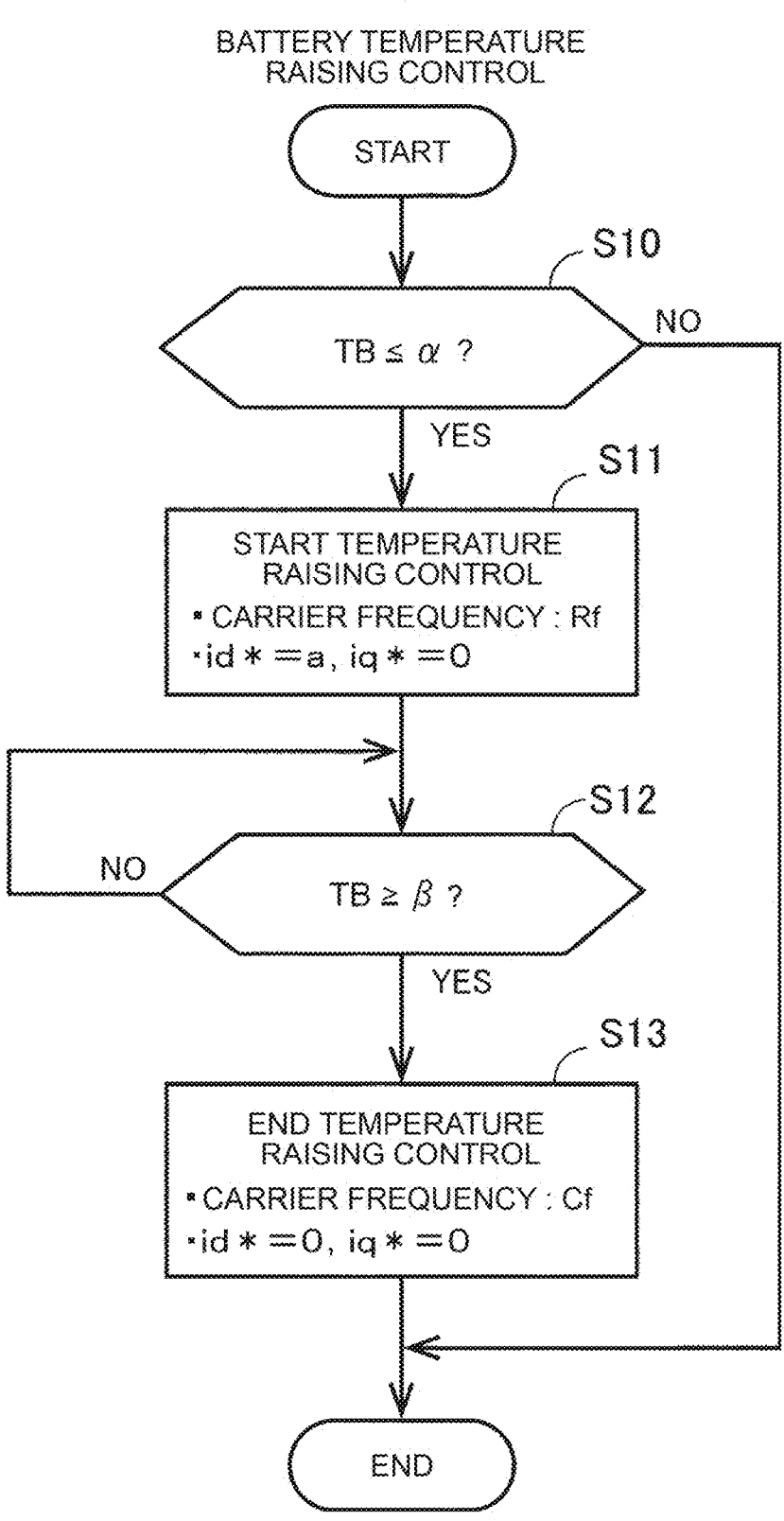
FIG. 3 is a flowchart illustrating an exemplary battery temperature raising control executed by the control ECU.

FIG. 3 is a flowchart illustrating an example of a battery temperature raising control that is executed by the control ECU 50. This flowchart is executed when there is a request for external charging (charging request) of the battery 30. For example, the plug 201 may be connected to the inlet 90, and a charging request may be issued when a charging instruction is issued. In addition, when the timer charging is set, it may be determined that a charging request has been made when the time is before the setting time from the charging start time. When a charge is requested, the control ECU 50 determines whether or not the temperature TB of the battery 30 is equal to or lower than the predetermined temperature a in step (hereinafter, step is abbreviated as "S") 10. The predetermined temperature a may be, for example, 0 [° C.]. When the temperature TB is equal to or lower than the predetermined temperature a, an affirmative determination is made and the process proceeds to S11. When the temperature TB is higher than the predetermined temperature a, the present routine is ended.

In S11, the temperature raising control is executed. The temperature raising control is MG control for controlling MG 10, and sets the carrier frequency of the inverter 20 to Rf to drive the inverter 20. Rf is the resonance frequency of the battery circuit. When the carrier frequency is set to the resonance frequency (Rf), the switching frequency of the inverter 20 becomes Rf. At this time, the vehicle V is being prepared for external charging or is being externally charged, since it is stopped, so that the torque is not outputted from MG 10, q-axis current command value iq* is set to zero, d-axis current command value id* is set to a predetermined value a. The resonance frequency (Rf) is obtained in advance by experimentation or the like, and is stored in the control ECU 50.

When the switching frequency of the inverter 20 is set to Rf, a switching ripple current having a frequency of Rf flows to the battery 30. Since PWM control of the inverter 20 switches the switching elements Q1 to Q6 based on the switching frequency (carrier frequency), a switching ripple current having a Rf frequency is generated using this switching operation as an excitation source. As a result, the frequency (ripple frequency) of the current ripple for raising the temperature of the battery 30 coincides with the resonance frequency (Rf), the amplitude of the current ripple increases due to the resonance, and the amount of Joule heat generated increases. Therefore, the temperature of the battery 30 can be raised efficiently.

In the following S12, it is determined whether or not the temperature TB of the battery 30 is equal to or higher than the predetermined temperature p. The predetermined temperature R is a value larger than the predetermined temperature a, and may be, for example, 15 [° C.]. When the temperature TB is lower than the predetermined temperature p, the temperature raising control is continued. When the temperature TB is equal to or higher than the predetermined temperature p, the process proceeds to S13, and the temperature raising control is ended. In the termination of the temperature raising control, the carrier frequency is set to Cf, and the drive of the inverter 20 (MG 10) is stopped by setting the d-axis current command value id* and the q-axis current command value iq* to zero. Note that Cf is a carrier frequency at a normal time, and may be, for example, 5000 [Hz]. After the temperature raising control is completed, the present routine is ended. During the temperature raising control, the system main relay SMR is closed.

Figures 4A, 4B:
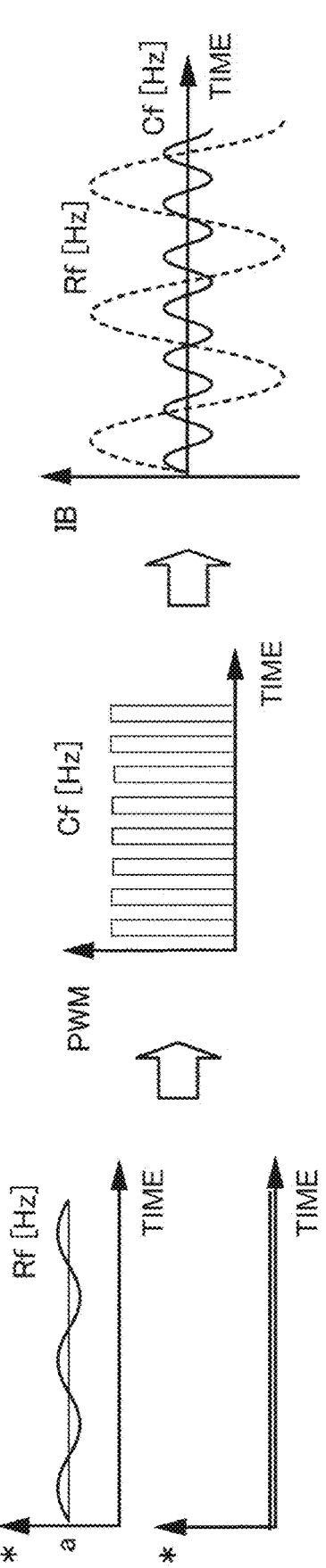
FIG. 4A illustrates a ripple current in a battery temperature raising control.
FIG. 4B illustrates a comparative example of the ripple current in the battery temperature raising control.

FIGS. 4A and 4B are diagrams for describing ripple current in the temperature raising control of the battery 30. FIG. 4A is an example of a ripple current in the present embodiment, and the q-axis current command value iq* is set to zero and the d-axis current command value id* is set to a predetermined value a when the temperature raising control is started in S11 (FIG. 3). Then, the carrier frequency is set to Rf, and PWM control of the inverter 20 is executed. As a result, a switching ripple current having a Rf frequency is generated. Since Rf is the resonance frequency of the battery circuitry, the ripple frequency of the input and output current IB of the battery 30 coincides with the resonance frequency (Rf), and the amplitude of the current ripple of the input and output current IB increases due to the resonance. As a result, the amount of Joule heat generated is increased, and the temperature of the battery 30 is efficiently raised. The magnitude of the predetermined value a may be determined experimentally or the like so that the amplitude of the current ripple of the input and output current IB due to the resonance is large enough to raise the temperature of the battery 30.

FIG. 4B is an example of a ripple current in the comparative example. In the comparative example, the carrier frequency is set to Cf. Then, the q-axis current command value iq* is set to zero, and the d-axis current command value id* is set to a value obtained by superimposing the resonance ripple current of the resonance frequency (Rf) on the predetermined value a. The current ripple of the input and output current IB of the battery 30 is generated in a region of a resonance frequency (Rf) whose amplitude is increased by resonance (see a broken line) and a region of a carrier frequency (Cf) (see a solid line) caused by a switching ripple current. The sound pressure level increases in the two frequency ranges, which increases loudness. The input and output current IB is a wave form in which a solid line is superimposed on a broken line in FIG. 4B.

On the other hand, in the present embodiment shown in FIG. 4A, the current ripple of the input and output current IB is generated only in the area of the resonance frequency (Rf), so that it is possible to reduce an increase in loudness.

In the present embodiment, during the temperature raising control of the battery 30, the switching frequency (carrier frequency) of the inverter 20 is set to the resonance frequency (Rf) of the battery, and the inverter 20 is driven. The ripple frequency of the input and output current IB of the battery 30 coincides with the resonance frequency (Rf), and the amplitude of the current ripple of the input and output current IB increases due to the resonance. As a result, the amount of Joule heat generated is increased, and the temperature of the battery 30 is efficiently raised. Since the current ripple of the input and output current IB occurs only in the resonance frequency (Rf) range, loudness will not increase.

In the above-described embodiment, the temperature raising control of the battery 30 is performed when there is a charging request. However, even when there is no charge demand, the temperature raising control may be executed when the temperature TB of the battery 30 is low. The d-axis current command value id* and the q-axis current command value iq* may be set to a value calculated based on the output torque command value, and the carrier frequency of the inverter 20 may be set to Rf. When raising of the temperature (heating) of the battery 30 is completed, the carrier frequency of the inverter 20 may be set to Cf (returned to Cf).

The embodiment disclosed herein should be considered as illustrative and not restrictive in all respects. The scope of the present disclosure is shown by the claims, rather than the above embodiments, and is intended to include all modifications within the meaning and the scope equivalent to those of the claims.

What is claimed is:

1. A battery system comprising:

a battery pack that is an assembly of single cells electrically connected in series;

an electrical machine;

an inverter connected between the battery pack and the electrical machine, the inverter being configured to convert direct current power stored in the battery pack to alternating current power to supply the alternating current power to the electrical machine;

a control device configured to drive the inverter by pulse-width modulation, and perform a warming process of increasing a temperature of the battery pack;

a first relay connected between the inverter and a first terminal of the battery pack;

a second relay connected between the inverter and a second terminal of the battery pack; and a capacitor connected between a first power line and a second power line, the first power line connecting the first relay and the inverter, and the second power line connecting the second relay and the inverter, wherein the first relay and the second relay are closed during the warming process, the warming process includes setting a switching frequency of the pulse-width modulation to the same frequency as a resonance frequency of a circuit that includes the battery pack and the capacitor, the battery system is mounted on a vehicle, the vehicle including a charging inlet, and the control device is configured to detect insertion of a plug of an electronic charger into the charging inlet, detect the temperature of the battery pack using a temperature sensor, determine whether the detected temperature of the battery pack is equal to or lower than a first predetermined temperature, in response to the insertion of the plug, start the warming process in response to determining that the temperature of the battery pack is equal to or lower than the first predetermined temperature, determine whether the detected temperature of the battery pack is equal to or higher than a second predetermined temperature that is larger than the first predetermined temperature, during the warming process, and end the warming process in response to determining that the detected temperature of the battery pack is equal to or higher than the second predetermined temperature.

2. The battery system according to claim 1, wherein:

the electrical machine is a rotating electrical machine; and the warming process further includes setting a d-axis current of the rotating electrical machine to a predetermined value, and setting a q-axis current of the rotating electrical machine to zero.

3. The battery system according to claim 1, wherein:

the pulse-width modulation is performed with a predetermined frequency at a time other than duration of the warming process; and the control device is configured to set the switching frequency to the predetermined frequency to end the warming process.

4. The battery system according to claim 2, wherein the control device is configured to set the d-axis current and the q-axis current to zero to end the warming process, in response to determining that the detected temperature of the battery pack is equal to or higher than the second predetermined temperature.

5. The battery system according to claim 1, further comprising a sensor in the circuit, the sensor being configured to detect a voltage across the capacitor.

* * * * *